US012589867B2

(12) United States Patent
Lavallee et al.

(10) Patent No.: US 12,589,867 B2
(45) **Date of Patent: *Mar. 31, 2026**

(54) HELICOPTER TAIL ROTOR DRIVE SYSTEM ON DEMAND SPEED CONTROL

(71) Applicant: Textron Innovations Inc., Providence, RI (US)

(72) Inventors: Yann Lavallee, Joliette (CA); Scott D. Poster, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/212,032

(22) Filed: Jun. 20, 2023

(65) Prior Publication Data

US 2023/0348051 A1 Nov. 2, 2023

Related U.S. Application Data

(63) Continuation of application No. 17/357,361, filed on Jun. 24, 2021, now Pat. No. 11,718,392.

(51) Int. Cl.
| | |
|---|---|
| *B64C 27/56* | (2006.01) |
| *B64C 13/04* | (2006.01) |
| *B64C 27/12* | (2006.01) |
| *B64C 27/82* | (2006.01) |

(52) U.S. Cl.
CPC ........... *B64C 27/56* (2013.01); *B64C 13/044* (2018.01); *B64C 27/12* (2013.01); *B64C 27/82* (2013.01)

(58) Field of Classification Search
CPC .......... B64C 27/56; B64C 27/57; B64C 27/82
See application file for complete search history.

(56) References Cited

U.S. PATENT DOCUMENTS

| | | | | |
|---|---|---|---|---|
| 3,528,633 | A * | 9/1970 | Knemeyer ........... | G05D 1/0816 |
| | | | | 244/179 |
| 3,576,302 | A * | 4/1971 | Palfreyman ............. | B64C 13/24 |
| | | | | 244/236 |
| 4,376,979 | A * | 3/1983 | Fowler ..................... | B64C 27/50 |
| | | | | 416/143 |
| 6,002,349 | A * | 12/1999 | Greene .................. | B64D 43/00 |
| | | | | 340/407.1 |
| 6,929,215 | B2 * | 8/2005 | Arlton ..................... | A63H 27/12 |
| | | | | 244/17.11 |
| 7,427,046 | B2 * | 9/2008 | Bellera ................... | B64C 27/78 |
| | | | | 244/17.21 |
| 7,644,893 | B2 * | 1/2010 | Boczar .................... | B64C 27/56 |
| | | | | 244/220 |
| 9,290,266 | B2 * | 3/2016 | Robertson ............... | B64C 27/12 |

(Continued)

FOREIGN PATENT DOCUMENTS

| | | | | |
|---|---|---|---|---|
| CA | 2569236 C | * | 8/2009 | ............. A63H 27/02 |
| DE | 102019005141 A1 | * | 1/2021 | |

(Continued)

*Primary Examiner* — Joseph W Sanderson
(74) *Attorney, Agent, or Firm* — FBT Gibbons LLP

(57) ABSTRACT

Tail rotor control system is described for helicopters. A pedal position sensor operable by a pilot yields greater tail rotor RPM relative to the main rotor RPM, giving the pilot increased control over the vehicle. This proves especially useful in certain situations, such as high altitude, where increasing tail rotor speed from main rotor speed can give a pilot increased maneuverability and stability.

20 Claims, 7 Drawing Sheets

(56) References Cited

U.S. PATENT DOCUMENTS

| | | | | |
|---|---|---|---|---|
| 10,124,889 B2 * | 11/2018 | Waltner | ................. | B64C 27/82 |
| 10,315,779 B2 * | 6/2019 | Bothwell | ........... | B64D 45/0005 |
| 10,377,470 B2 * | 8/2019 | Alfred | ................... | B64C 13/503 |
| 10,377,479 B2 * | 8/2019 | Parsons | ................... | B64C 27/82 |
| 10,647,414 B2 * | 5/2020 | Alfred | ................. | G05D 1/0061 |
| 10,787,253 B2 * | 9/2020 | Parsons | ................... | B64C 27/82 |
| 10,843,791 B2 * | 11/2020 | Alfred | ................... | B64C 13/04 |
| 11,247,782 B2 * | 2/2022 | Klein | ................. | G06F 16/9017 |
| 11,433,997 B2 * | 9/2022 | Acee | ...................... | B64D 27/32 |
| 11,718,392 B2 * | 8/2023 | Lavallee | .............. | B64C 13/044 |
| | | | | 244/17.19 |
| 11,801,936 B2 * | 10/2023 | Brand | ..................... | B64C 27/57 |
| 2004/0217229 A1 * | 11/2004 | Arlton | .................... | B64C 27/12 |
| | | | | 244/17.11 |
| 2005/0284983 A1 * | 12/2005 | Bellera | ................... | B64C 27/78 |
| | | | | 244/17.13 |
| 2007/0205333 A1 * | 9/2007 | Boczar | ................... | B64C 27/68 |
| | | | | 244/220 |
| 2015/0274287 A1 * | 10/2015 | Robertson | .............. | B64C 27/12 |
| | | | | 475/269 |
| 2016/0325830 A1 * | 11/2016 | Waltner | ................ | B64D 25/00 |
| 2017/0349273 A1 * | 12/2017 | Parsons | .................. | B64C 27/82 |
| 2018/0244369 A1 * | 8/2018 | Alfred | ................... | B64C 13/503 |
| 2019/0016443 A1 * | 1/2019 | Alfred | ................... | B64C 13/503 |
| 2019/0071173 A1 * | 3/2019 | Parsons | .................. | B64C 27/82 |
| 2019/0084690 A1 * | 3/2019 | Bothwell | .............. | B64C 13/503 |
| 2019/0351995 A1 * | 11/2019 | Alfred | ................... | B64C 13/18 |
| 2020/0023958 A1 * | 1/2020 | Acee | ..................... | B64C 13/044 |
| 2020/0094981 A1 * | 3/2020 | Klein | ..................... | F01D 21/14 |
| 2022/0227488 A1 * | 7/2022 | Brand | .................... | B64C 27/82 |
| 2022/0411050 A1 * | 12/2022 | Lavallee | ............... | B64C 27/56 |

FOREIGN PATENT DOCUMENTS

| | | | | |
|---|---|---|---|---|
| GB | 1105201 A | * | 3/1968 | |
| WO | WO-9965768 A1 | * | 12/1999 | ............. B64C 27/06 |

* cited by examiner

420

425

428

415

400

430

Figures 5, 6:
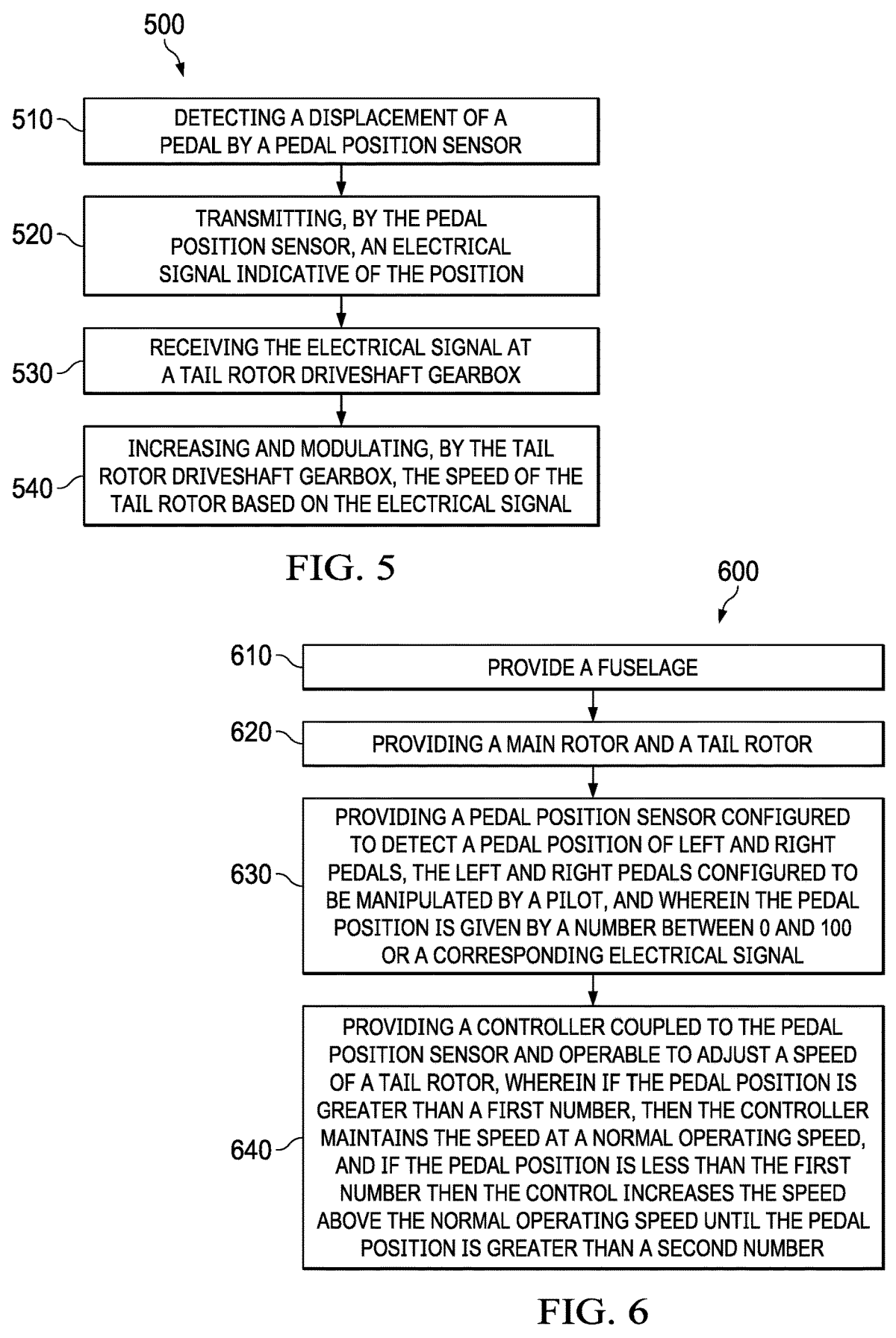

500

| 510 | DETECTING A DISPLACEMENT OF A PEDAL BY A PEDAL POSITION SENSOR |
|---|---|
| 520 | TRANSMITTING, BY THE PEDAL POSITION SENSOR, AN ELECTRICAL SIGNAL INDICATIVE OF THE POSITION |
| 530 | RECEIVING THE ELECTRICAL SIGNAL AT A TAIL ROTOR DRIVESHAFT GEARBOX |
| 540 | INCREASING AND MODULATING, BY THE TAIL ROTOR DRIVESHAFT GEARBOX, THE SPEED OF THE TAIL ROTOR BASED ON THE ELECTRICAL SIGNAL |

| 610 | PROVIDE A FUSELAGE |
|---|---|
| 620 | PROVIDING A MAIN ROTOR AND A TAIL ROTOR |
| 630 | PROVIDING A PEDAL POSITION SENSOR CONFIGURED TO DETECT A PEDAL POSITION OF LEFT AND RIGHT PEDALS, THE LEFT AND RIGHT PEDALS CONFIGURED TO BE MANIPULATED BY A PILOT, AND WHEREIN THE PEDAL POSITION IS GIVEN BY A NUMBER BETWEEN 0 AND 100 OR A CORRESPONDING ELECTRICAL SIGNAL |
| 640 | PROVIDING A CONTROLLER COUPLED TO THE PEDAL POSITION SENSOR AND OPERABLE TO ADJUST A SPEED OF A TAIL ROTOR, WHEREIN IF THE PEDAL POSITION IS GREATER THAN A FIRST NUMBER, THEN THE CONTROLLER MAINTAINS THE SPEED AT A NORMAL OPERATING SPEED, AND IF THE PEDAL POSITION IS LESS THAN THE FIRST NUMBER THEN THE CONTROL INCREASES THE SPEED ABOVE THE NORMAL OPERATING SPEED UNTIL THE PEDAL POSITION IS GREATER THAN A SECOND NUMBER |

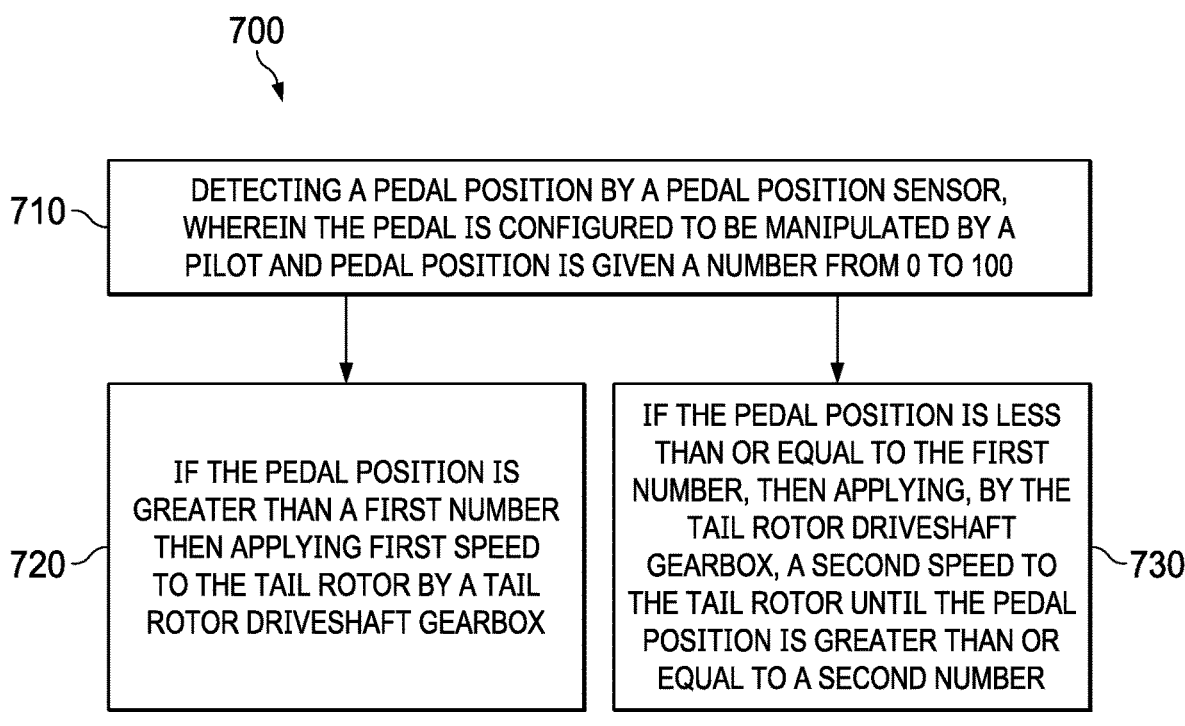

710 — DETECTING A PEDAL POSITION BY A PEDAL POSITION SENSOR, WHEREIN THE PEDAL IS CONFIGURED TO BE MANIPULATED BY A PILOT AND PEDAL POSITION IS GIVEN A NUMBER FROM 0 TO 100

720 — IF THE PEDAL POSITION IS GREATER THAN A FIRST NUMBER THEN APPLYING FIRST SPEED TO THE TAIL ROTOR BY A TAIL ROTOR DRIVESHAFT GEARBOX

IF THE PEDAL POSITION IS LESS THAN OR EQUAL TO THE FIRST NUMBER, THEN APPLYING, BY THE TAIL ROTOR DRIVESHAFT GEARBOX, A SECOND SPEED TO THE TAIL ROTOR UNTIL THE PEDAL POSITION IS GREATER THAN OR EQUAL TO A SECOND NUMBER — 730

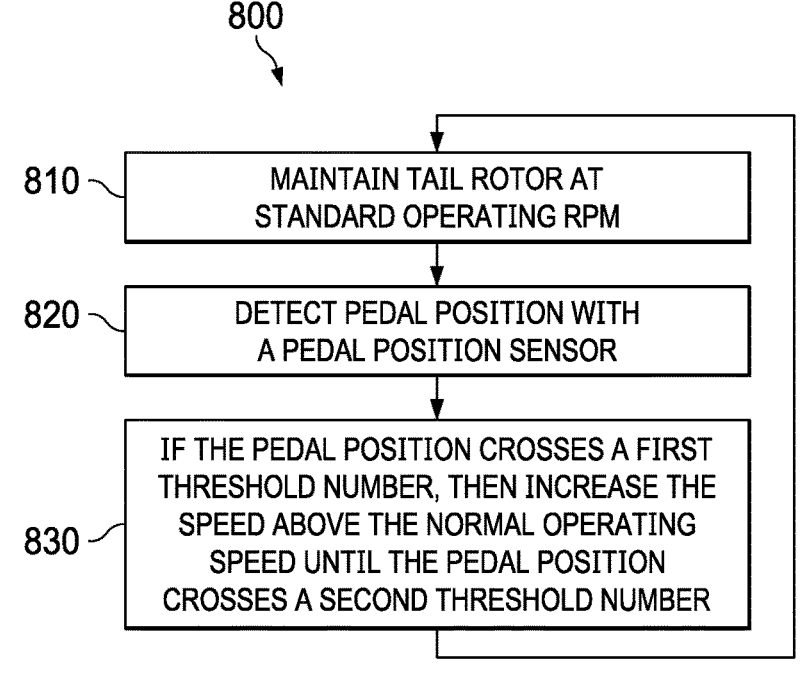

810 — MAINTAIN TAIL ROTOR AT STANDARD OPERATING RPM

820 — DETECT PEDAL POSITION WITH A PEDAL POSITION SENSOR

830 — IF THE PEDAL POSITION CROSSES A FIRST THRESHOLD NUMBER, THEN INCREASE THE SPEED ABOVE THE NORMAL OPERATING SPEED UNTIL THE PEDAL POSITION CROSSES A SECOND THRESHOLD NUMBER

FIG. 8

HELICOPTER TAIL ROTOR DRIVE SYSTEM ON DEMAND SPEED CONTROL

CROSS REFERENCE TO RELATED DATA

This application is a continuation of U.S. patent application Ser. No. 17/357,361, filed Jun. 24, 2021, titled Helicopter Tail Rotor Drive System On Demand Speed Control, now U.S. Pat. No. 11,718,392, the contents of which are hereby incorporated herein in its entirety.

TECHNICAL FIELD

The present disclosure is directed to helicopter rotors and rotor control systems.

BACKGROUND OF THE INVENTION

The main rotor and blades on a helicopter provide the thrust for liftoff of the vehicle. The force used to spin the main rotor and blades exert an opposite rotational force on the fuselage. Without a stabilizing force the fuselage would spin in reaction to the main rotor and blades. The tail rotor and its blades, extending backward from the fuselage, helps to counteract the spinning force of the main rotor and blades, thereby stabilizing the fuselage.

BRIEF SUMMARY OF THE INVENTION

One embodiment under the current disclosure comprises a helicopter, comprising: a tail rotor configured to spin two or more tail rotor blades; a main rotor configured to spin two or more main rotor blades; left and right pedals configured to be manipulated by a pilot; a pedal position sensor configured to detect a pedal position of the left and right pedals; and a controller coupled to the pedal position sensor and operable to adjust a speed of the tail rotor, wherein if the pedal position is greater than a first number, then the controller maintains the speed at a normal operating speed, and if the pedal position is less than the first number then the control increases the speed above the normal operating speed until the pedal position is greater than a second number.

Another possible embodiment comprises a control system for a helicopter, comprising: a pedal position sensor configured to detect a pedal position of left and right pedals, the left and right pedals configured to be manipulated by a pilot; and a controller coupled to the pedal position sensor and operable to adjust a speed of a tail rotor, the controller operable to maintain the tail rotor at a normal operating speed, wherein if the pedal position crosses a first threshold number, then the controller increases the speed above the normal operating speed until the pedal position crosses a second threshold number.

Another possible embodiment is a method of adjusting a tail rotor on a helicopter, comprising: detecting a pedal position by a pedal position sensor, wherein the pedal is configured to be manipulated by a pilot and pedal position is given a number from 0 to 100; if the pedal position is greater than a first number then applying first speed to the tail rotor by a tail rotor driveshaft gearbox; and if the pedal position is less than or equal to the first number, then applying, by the tail rotor driveshaft gearbox, a second speed to the tail rotor until the pedal position is greater than or equal to a second number.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 5 is a diagram of a method embodiment under the present disclosure.

FIG. 6 is a diagram of a method embodiment under the present disclosure.

FIG. 7 is a diagram of a method embodiment under the present disclosure.

FIG. 8 is a diagram of a method embodiment under the present disclosure.

DETAILED DESCRIPTION OF THE INVENTION

Prior art helicopters have a main rotor and blades, as well as a tail rotor and tail rotor blades. The tail rotor apparatus helps to provide stabilizing force, otherwise the fuselage of the aircraft would spin in reaction to the spinning of the main rotor apparatus. The force applied to the tail rotor has previously been based on the power applied to the main rotor. A mechanical interconnection runs from the main rotor to the tail rotor, and as the main rotor speed is increased or slowed, the tail rotor speed is increased or slowed as well. Applicant has found that in some situations, such as high-altitude missions, increasing the tail rotor speed relative to the main rotor can have benefits for the maneuverability and stability of the helicopter. For example, the thinner air at high altitudes means that the tail rotor speed should sometimes be increased greater than the standard solution allows (i.e., setting tail rotor speed as a function of main rotor speed). Besides high altitude, there are situations where a helicopter would benefit from high power/slow flight speed conditions.

Figure 1:
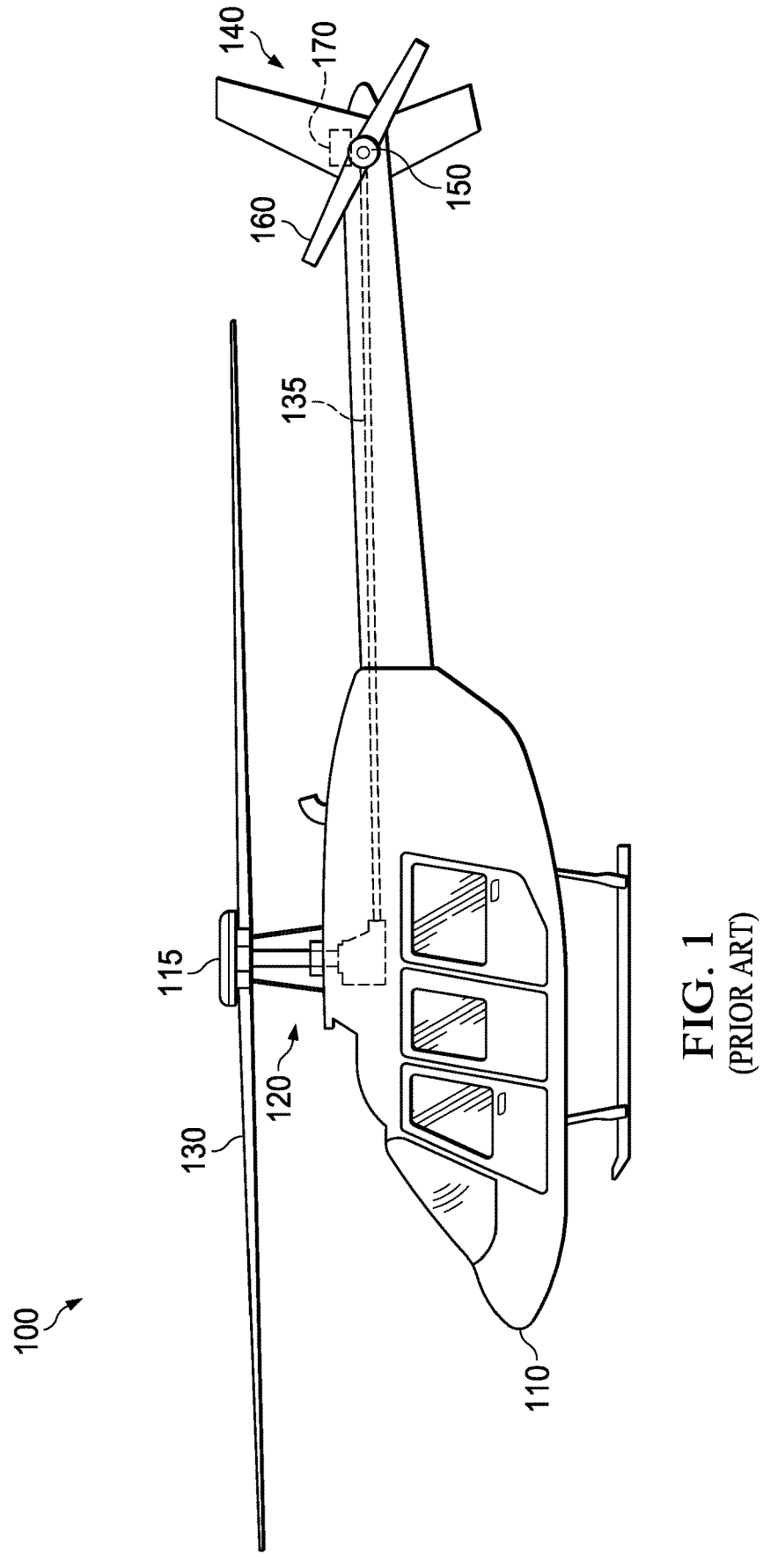
FIG. 1 is a diagram of a prior art embodiment.

Referring now to FIG. 1, a prior art helicopter 100 can be seen. The term "rotor apparatus" will be used to generally refer to a rotor, its respective blades, and respective components that assist in spinning that rotor. Helicopter 100 comprises a fuselage 110, with a main rotor apparatus 120 and a tail rotor apparatus 140. Main rotor apparatus comprises main rotor 115 and main blades 130. Tail rotor apparatus comprises tail rotor 150 and tail rotor blades 160. Tail rotor driveshaft 135 provides a connection from the main rotor apparatus 120 to tail rotor apparatus 140. As a pilot increases or decreases the speed of the main rotor 115, the speed of tail rotor 150 (including a tail rotor gearbox 170) is automatically adjusted as a constant function of main rotor speed.

Figure 2:
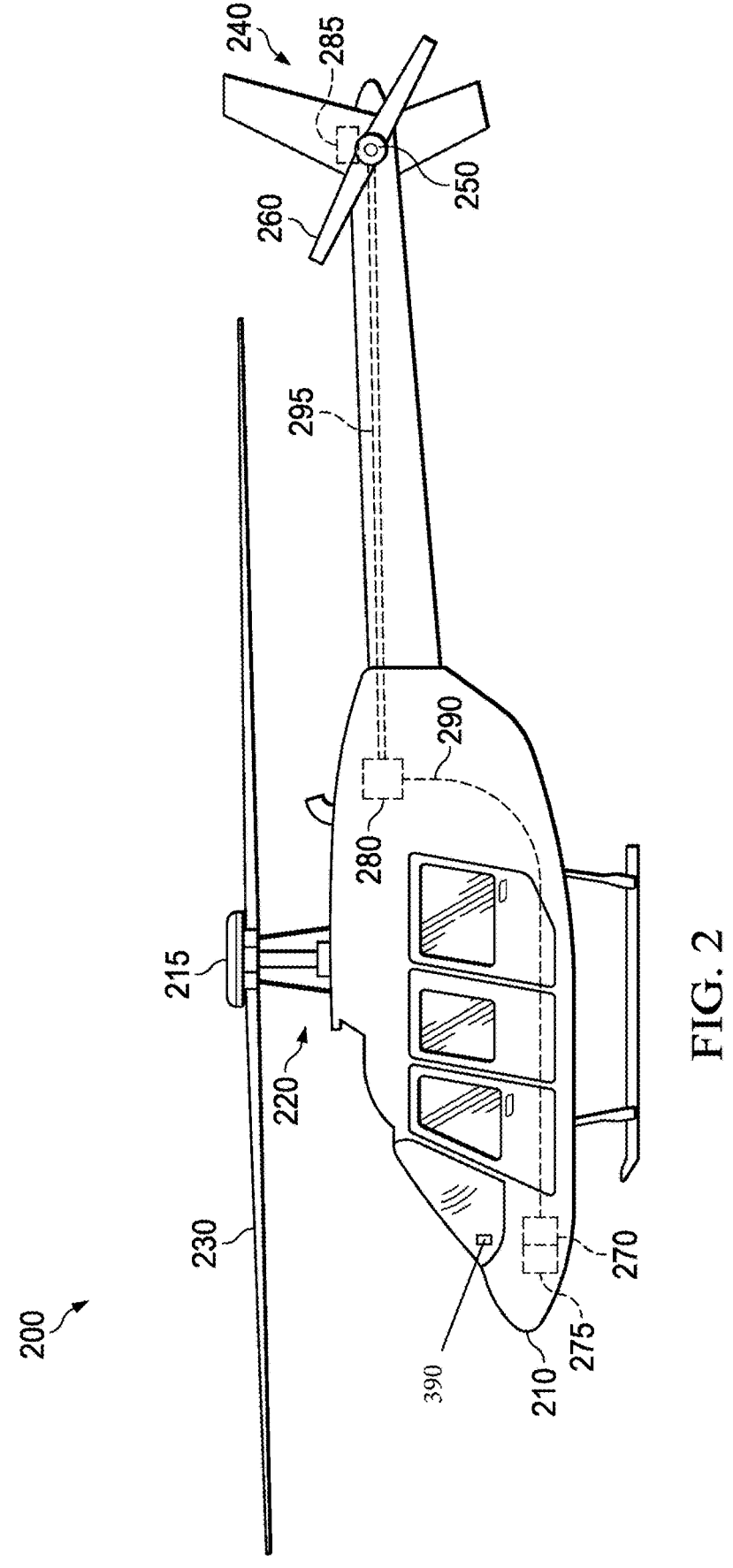
FIG. 2 is a diagram of a helicopter embodiment under the present disclosure.

FIG. 2 shows an embodiment under the present disclosure. Helicopter 200 comprises a fuselage 210, a main rotor apparatus 220, and a tail rotor apparatus 240. Main rotor apparatus 220 comprises main blades 230 and main rotor 215. Tail rotor apparatus 240 comprises tail rotor 250 and tail rotor blades 260. Helicopter 200 further comprises a pedal position sensor 270 and signal conditioner 290. Pedal position sensor 270 can comprise part of, or be coupled to flight control system or controller 275. Signal conditioner 290 couples the pedal position sensor 270 to the tail rotor driveshaft gearbox 280 which drives tail rotor 250 via driveshaft 295 and tail rotor gearbox 285. As the pedal (not shown) is pushed toward their travel extremities by the pilot, the pedal position sensor 270 sends a signal to the tail rotor driveshaft gearbox 280 to increase the speed of the tail rotor 250. This allows to increase the tail rotor RPM relative to the main rotor RPM. Increasing the tail rotor RPM can comprise increasing the RPM and then modulating, as further described herein. A controller 275 can be used in lieu of the pedal position sensor to allow the pilot to manually adjust the tail rotor speed as desired. In some embodiments, several components, like the tail rotor driveshaft gearbox 280 and the tail rotor gearbox 170 can be combined into one component with multiple functionalities.

Helicopter typically have two pedals (for each pilot, sometimes there are two pilots). Typically, the pilot can press the right pedal to yaw right, and the left pedal to yaw left. Commonly, for helicopters made or designed in the United States, pushing the left pedal is required when flight condition requires more power from the engine to maintain main rotor RPM. For such helicopters, a preferred embodiment incorporates a pedal position sensor 270 that will sense the remaining margin of the left pedal. Other embodiments are possible.

Figure 3:
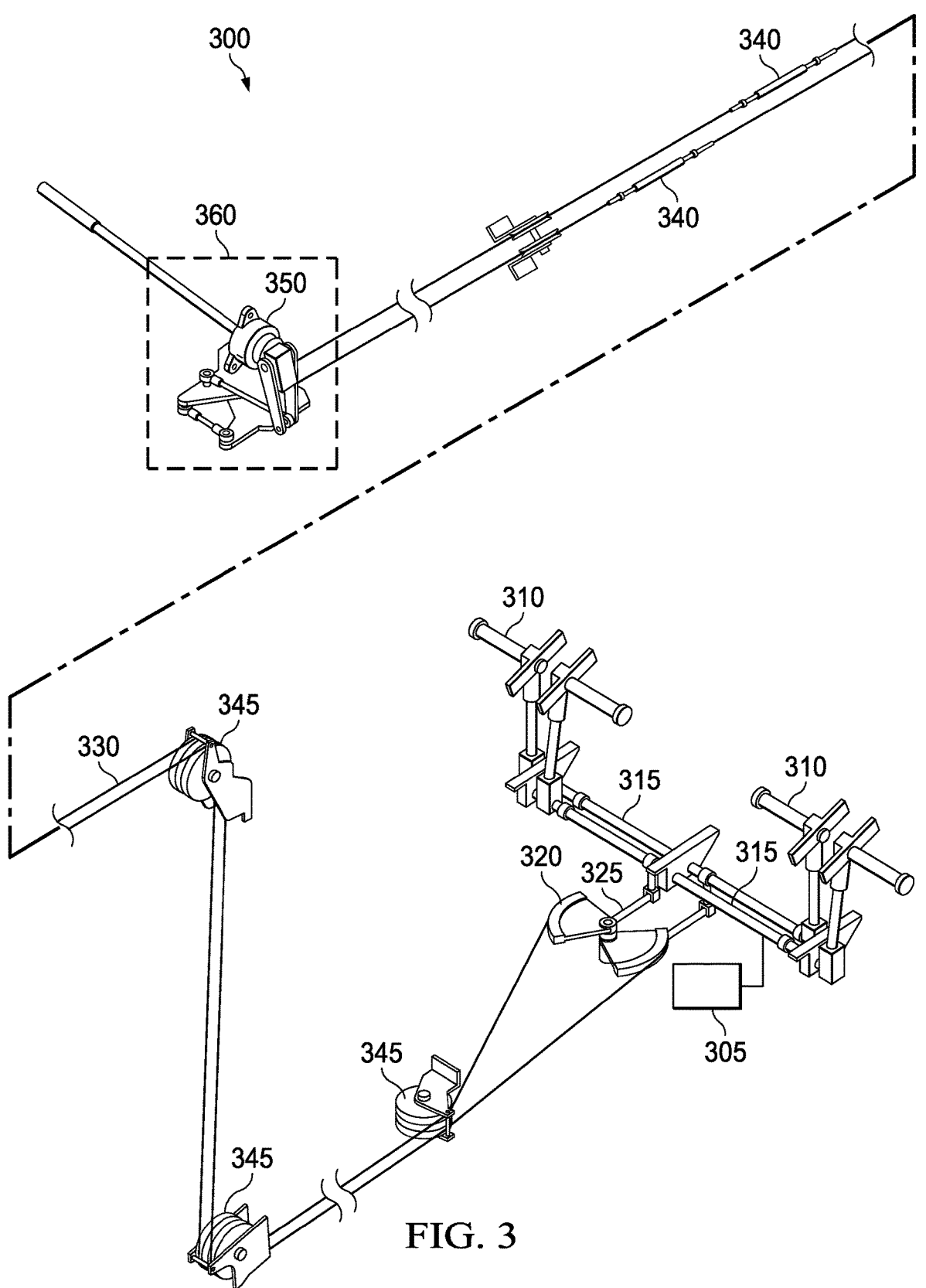
FIG. 3 is a diagram of a pedal and rotor control system embodiment under the present disclosure.

FIG. 3 shows one embodiment of a pedal position sensor 305, tail rotor blade angle control apparatus 360, and the intervening components allowing for adjustment of the tail rotor blade pitch with pedals 310. As shown, pedals 310 comprise a dual control kit allowing for two pilots.

Jackshafts interconnect the right pedals together and left pedals together 310. Pedal position sensor 305 can comprise a portion of a pedal 310 or otherwise be functional to measure the pedal position. Link 325 connects to quadrant 320 which connects to cables 330. Cables 330 can pass through a plurality of pulleys 345 before reaching pitch change mechanism 350 within tail rotor apparatus 360. Pitch change mechanism 350 can comprise means for adjusting the pitch of the tail or blades. FIG. 3 shows an embodiment with cables 330. However, other embodiments can utilize push pull rods or push pull cables as a means of adjusting pitch change mechanism 350 and/or tail rotor apparatus 360.

Figure 4A:
FIGS. 4A-4B are diagrams of a tail rotor drive system embodiment under the present disclosure.
Figure 4B:
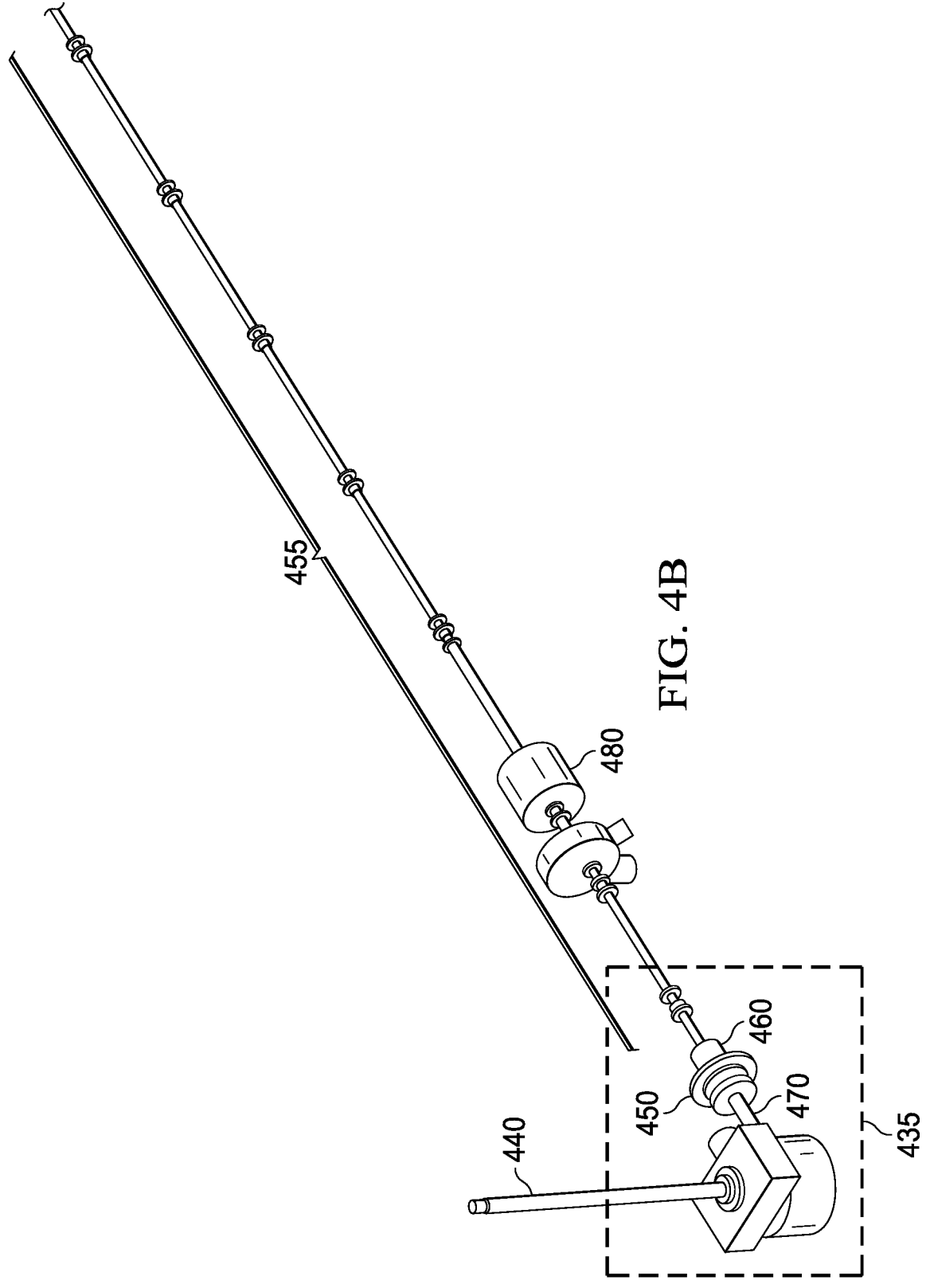

FIGS. 4A and 4B shows an embodiment of a tail rotor driveshaft gearbox 480 and associated components for providing power to a tail rotor. FIG. 4A shows helicopter 400 with main rotor 415, main blades 430, tail rotor apparatus

420, tail rotor 425, and tail rotor blades 428. In FIG. 4B, within the main rotor apparatus 435, mast assembly 440, rotor brake disc 450, freewheel assembly 460 and driveshaft 470 can be seen. Other embodiments are possible. For example, the rotor brake disc 450 could be installed adjacent to the main rotor apparatus 435 or anywhere on the tail rotor drive system 455. These components couple to what is generally referred to as the tail rotor drive system 455. Tail rotor driveshaft gearbox 480 can comprise a portion of the tail rotor drive system 455. The tail rotor driveshaft gearbox 480 can be installed at the root of the tail rotor drive system 455 to reduce the longitudinal moment on the center of gravity and to lower drive shaft RPM (revolutions per minute) and wear, thus increase maintenance interval and reducing the cost per hour of operation. During normal operation the power applied to the main rotor 415 can dictate the power applied to the tail rotor 425 via tail rotor drive system 455. However, circumstances may arise where the pilot desires to apply a different or greater power to the tail rotor 425. In these cases, the pilot can increase and modulate the output of the tail rotor driveshaft gearbox 480, such as by pedals 310 of FIG. 3, and pedal position sensor 305 of FIG. 3 (or 270 of FIG. 2) via signal conditioner 290 of FIG. 2 that can be coupled to the tail rotor driveshaft gearbox 480 (analogous to tail rotor gearbox 280 of FIG. 2). Tail rotor driveshaft gearbox 480 can apply a different gear to power the tail rotor drive system 455, thereby adjusting the speed of tail rotor 420.

The embodiment of FIG. 2 comprises a pedal and pedal position sensor 270. However, other embodiments may incorporate a tail rotor driveshaft gearbox control system in a lever, a button, or other handle or modulator (390) that is operable by a pilot. For example, a dashboard in a helicopter could comprise a lever that allows the pilot to increase and modulate the output of the tail rotor driveshaft gearbox. In such embodiments there would be a level position sensor that can be coupled to the tail rotor driveshaft gearbox 280 via signal conditioner 290, and so forth. A button, rotatable dial, or series of buttons could be used as well. Some embodiments, such as a rotatable dial that allows a pilot to choose amongst a plurality of speeds for the tail rotor, may not need a position sensor. Any embodiment that allows a pilot to adjust tail rotor speed to a plurality of levels could be used.

Some helicopters have duplicate controls for a co-pilot. In such embodiments, it may be desirable to give the co-pilot a control for the tail rotor speed as well. For example, both pilots could be given a dial-based control. It is understood that pilot and copilot pedal system are linked and work in unison therefore the previously disclosed pedal position sensor would pedal position sensing for both the pilot and co-pilot.

Typically, helicopters have a left and right pedal for a pilot to use. The pedals are connected in that as one is pressed forward, the other pedal must move backward. The position where the left pedal is pressed forward/down completely is called the 0 position. At 0 the right pedal will be completely back/aft. The 50 position is where both pedals are equivalent. The 100 position is where the right pedal is pressed forward/down completely, and the left pedal is back or aft completely. A pedal position of 15 is when the left pedal is 15% from being completely pressed down, and the right pedal is 85% away from being pressed down, etc. Embodiments under the present disclosure can include a pedal position sensor that constantly measures or detects the position of the left pedal (or both pedals, or either pedal). Other means of measuring pedal position could also be used, like an electrical voltage value, or other means.

Once a helicopter has been turned on and after a warmup period, main rotors and tail rotors tend to rotate at a constant RPM throughout a flight. Commonly for helicopters, main rotors tend to rotate at 300-400 RPM, and tail rotors tend to rotate at 2000-2500 RPM. Other embodiments are possible. In many helicopters, how much thrust is created by each rotor is controlled by adjusting the pitch of the blades, not by increasing RPM. More power is needed to maintain a constant RPM as pitch is increased because more air is being displaced. Less power is needed as pitch is decreased because less air is being displaced.

During flight, the pilot can press the left pedal to yaw left. And the pilot can press the right pedal to yaw right. Pressing the pedals adjusts the pitch of the rotor blades, but the RPM of the tail rotor stays constant. The constant RPM is the standard operating RPM of the given helicopter. It has been found that in some situations, such as the high-altitude situations described above, it can be useful for the tail rotor RPM to be increased to above the standard operation RPM. For example, the standard operating RPM can be considered to be 100% power. An increased RPM can be at 104% of the standard operating RPM. For example, in some high-altitude maneuvers, as a pilot completely presses forward the left pedal the pitch of the tail rotor blades will be adjusted while RPMs are at 100%. The helicopter may not yaw left as it should due to the low air density, so greater power to the tail rotor is needed. But in a typical helicopter, RPM is already at 100% and can't be increased. But the standard adjust-ments to the pitch angle do not yield the desired leftward yaw desired by the pilot. The present disclosure allows the rotor power to be increased above the nominal RPM relative to the main rotor 100%.

In a preferred embodiment, when the left pedal is manipu-lated to anywhere from 0 to 10, then the power or RPMs applied to the tail rotor can be stepped up above 100% (the standard operating RPM). In a preferred embodiment, once the pedal position is moved to any position 0-10, then the tail rotor RPMs are increased to 105%. The tail rotor RPMs are preferably maintained at 105% until the pedal is moved to a position of 20 or larger. Due to hysteresis, and stability needs of the aircraft, it is preferred that the RPMs be held at 105% until high tail rotor power is no longer needed. Moving rapidly between standard operating RPM and 105% should be avoided. For this reason, 105% RPMs should be main-tained until pedal position is 20 or greater. The pedal position detailed above are approximate and are subject to adjustments due to tail rotor profiles and helicopter models.

The chosen levels for applying greater RPMs can vary. For example, in some embodiments it could be chosen to have an increased RPM level of 104%, that is applied at pedal positions of 0 to 12, and that 104% RPM is held until pedal position is 22 or greater.

Embodiments under the present disclosure can also include a failsafe. The failsafe can comprise electronics to measure the electrical signal from the pedal position sensor, or gearing on the tail rotor gearbox, that would prevent the tail rotor speed, or the power applied to it, from dropping large amounts. A fault in the pedal, pedal position sensor could drop the electrical signal to zero, implying the tail rotor driveshaft gearbox should default to the increased RPM. Electronics can be programmed to detect such sudden drops and to maintain a sufficient tail rotor power or speed. Or gearing in the gearbox can be setup to provide similar functionality, such that sudden drops in power are prevented. Monitoring of the system can be continuous by checking circuitry and or momentary by actuation of the system by the pilot to confirm availability prior to landing. For example, pressing a test button could momentarily increase the tail rotor RPM during flight.

FIG. 5 shows one method embodiment 500 under the present disclosure for adjusting a tail rotor. Step 510 is detecting a distance of displacement of a pedal by a pedal position sensor, wherein the pedal is configured to be manipulated by a pilot. Step 520 is transmitting, by the pedal position sensor, an electrical signal indicative of the posi-tion. Step 530 is receiving, at a tail rotor driveshaft gearbox, the electrical signal. Step 540 is increasing and modulating, by the tail rotor driveshaft gearbox, the speed of the tail rotor based on the electrical signal. FIG. 6 shows a possible method embodiment 600 of building a helicopter under the present disclosure. Step 610 is providing a fuselage. Step 620 is providing a main rotor and a tail rotor. Step 630 is providing a pedal position sensor configured to detect a pedal position of left and right pedals, the left and right pedals configured to be manipulated by a pilot, and wherein the pedal position is given by a number between 0 and 100, or a corresponding electrical signal. Step 640 is providing a controller coupled to the pedal position sensor and operable to adjust a speed of a tail rotor, wherein if the pedal position is greater than a first number, then the controller maintains the speed at a normal operating speed, and if the pedal position is less than the first number then the control increases the speed above the normal operating speed until the pedal position is greater than a second number.

FIG. 7 shows a further method embodiment 700 under the present disclosure. Step 710 is detecting a pedal position by a pedal position sensor, wherein the pedal is configured to be manipulated by a pilot and pedal position is given a number from 0 to 100. At step 720, if the pedal position is greater than a first number then applying first speed to the tail rotor by a tail rotor driveshaft gearbox. At step 730 if the pedal position is less than or equal to the first number, then applying, by the tail rotor driveshaft gearbox, a second speed to the tail rotor until the pedal position is greater than or equal to a second number.

It is to be understood that the description above has focused on use of a left pedal to increase tail rotor speed, and that pedal position has been described as 0 to 100 based on the left pedal. However, the teachings described herein can be implemented in position measurement systems that use different measurement systems. For instance, 0 to 100 could be based on the right pedal, or a different number system could be used. In addition, some helicopters embodiments under the present disclosure can use the right pedal to affect tail rotor speed. For example, with reference to FIG. 7, for a helicopter with a left pedal-based position sensor and left pedal use for increasing tail rotor speed, the first number could be 12 and the second number could be 18 for heli-copters with main rotor turning counterclockwise. But for a helicopter with main rotor turning clockwise and right pedal use for tail rotor speed, the same functionality can be achieved with a first number of 88 and second number of 82. The number previously mentioned are configurable to allow applicability to different helicopter models and tail rotor designs. For clockwise main rotor aircraft, the method of FIG. 7 would be adjusted to reflect that the standard RPM should be maintained up until, for example, position 88. Then the increased RPM would be applied until pedal position was, for example, 82 or less.

For example, a controller for a clockwise main rotor aircraft could be described as: operable to adjust a speed of a tail rotor, wherein if the pedal position is less than a first number, then the controller maintains the speed at a normal operating speed, and if the pedal position is greater than the first number then the control increases the speed above the normal operating speed until the pedal position is less than a second number.

A method embodiment 800 of controlling a helicopter tail rotor, covering both clockwise and counterclockwise turning main rotors can be seen in FIG. 8. Step 810 is maintaining the tail rotor at a standard operating RPM. Step 820 is detecting pedal position with a pedal position sensor. At step 830, if the pedal position crosses a first threshold number, then increase the speed above the normal operating speed until the pedal position crosses a second threshold number. The method can then return to 810.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system of a helicopter, comprising:
a tail rotor including two or more tail rotor blades, wherein the tail rotor is configured to spin the two or more tail rotor blades at a standard tail operating speed, wherein the tail rotor is further configured to adjust a pitch of the two or more tail rotor blades;
a main rotor configured to spin two or more main rotor blades at a standard main operating speed; and
a controller configured to be operable by a user to adjust a speed of the tail rotor and the pitch of the two or more tail rotor blades, wherein the controller is configured to allow the user to increase a rotational speed of the tail rotor above the standard tail operating speed, wherein the controller is configured to receive an input, wherein the controller includes physical instructive components configured to increase the rotational speed of the tail rotor from a slow speed to a fast speed upon the input transitioning from a second value to a first value and to then maintain the fast speed upon the input returning to the second value and to decrease the rotational speed to the slow speed upon the input achieving a third value, wherein the second value is between the first value and the third value.

2. The system of claim 1, further comprising a failsafe, the failsafe configured to maintain a safe tail rotor speed if input from the controller is lost.

3. The system of claim 2, further comprising a pedal inside of the helicopter and configured to control an aspect of the tail rotor, wherein the failsafe is configured to detect a fault in the pedal.

4. The system of claim 1, further comprising a test button operable to be pressed by the user, wherein pressing the test button momentarily increases the speed of the tail rotor during flight.

5. The system of claim 1, wherein the controller comprises a rotatable dial.

6. The system of claim 1, wherein when the controller increases the rotational speed of the tail rotor then the rotational speed is increased to 105% of the standard tail operating speed.

7. The system of claim 1, wherein the controller is coupled to a tail rotor driveshaft gearbox installed at a root of a tail rotor driveshaft in order to adjust the rotational speed of the tail rotor.

8. The system of claim 1, wherein the controller comprises a lever.

9. The system of claim 1, wherein the controller comprises a plurality of buttons configured to allow a user to select from a plurality of rotational speeds.

10. The system of claim 1, wherein the helicopter comprises a main rotor that spins clockwise.

11. A control system for a helicopter, comprising
a controller, the controller being configured to be coupled to a tail rotor of the helicopter, wherein the controller is structurally configured and positioned to receive an input from a user, wherein the controller includes physical instructive components configured to increase a rotational speed of the tail rotor from a slow speed to a fast speed upon the input transitioning from a second value to a first value and to then maintain the fast speed upon the input returning to the second value and to decrease the rotational speed to the slow speed upon the input achieving a third value, wherein the second value is between the first value and the third value.

12. The control system of claim 11, wherein the controller comprises a rotatable dial configured to receive the input from the user.

13. The control system of claim 11, wherein the control system comprises a second controller operable by a second user, the second controller configured to be operable by a second user to selectively increase the rotational speed of the tail rotor above the slow speed.

14. The control system of claim 11, wherein the controller is coupled to a tail rotor gearbox configured to adjust the rotational speed of the tail rotor.

15. The control system of claim 11, wherein when the controller increases the rotational speed of the tail rotor then the rotational speed is increased to at least 104% of the slow speed.

16. The control system of claim 11, further comprising a failsafe configured to maintain rotational speed of the tail rotor at a minimum level if the controller is broken.

17. A method of operating a tail rotor on a helicopter, comprising:
operating the tail rotor at a standard operating speed;
receiving, by a controller, an input from a user, the controller operable to increase a rotational speed of the tail rotor above the standard operating speed upon receiving the input; and
increasing, by the controller, the rotational speed of the tail rotor above the standard operating speed when the input transitions from a second value to a first value;
maintaining, by the controller, the rotational speed of the tail rotor above the standard operating speed once the input transitions from the first value back to the second value; and decreasing, by the controller, the rotational speed of the tail rotor from being above the standard operating speed to the standard operating speed once the input transitions from the second value to a third value, wherein the second value is between the first value and the third value.

18. The method of claim 17, wherein the input comprises an adjustment to a rotatable dial.

19. The method of claim 17, wherein the controller is operable to increase the rotational speed to at least 104% of the standard operating speed upon receiving the input.

20. The method of claim 17, wherein the input comprises an input from a button.

* * * * *